United States Patent Office 3,125,568
Patented Mar. 17, 1964

3,125,568
1,5-DIAZACYCLOOCTANE DERIVATIVES AND THE PREPARATION THEREOF
Ernst Jucker, Ettingen, Basel-Land, Adolf J. Lindenmann, Basel, and John Gmünder, Muttenz, Basel-Land, Switzerland, assignors to Sandoz Ltd., Basel, Switzerland, a Swiss firm
No Drawing. Filed Nov. 13, 1961, Ser. No. 152,054
Claims priority, application Switzerland Nov. 17, 1960
5 Claims. (Cl. 260—239)

The present invention relates to new 1,5-diazacyclooctane derivatives, their physiologically acceptable salts with acids and to a process for their production.

The new 1,5-diazacyclooctane derivatives of the present invention correspond to the general Formula I

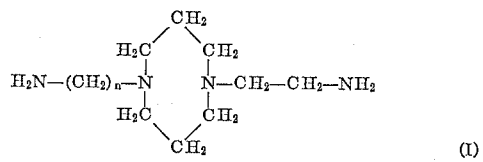

wherein $n$ represents an integer from 2 to 12 inclusive.

The aforesaid 1,5-diazacyclooctane derivatives of the general Formula I are prepared according to this invention by treating 1,5-diazacyclooctane with formaldehyde, reacting the resulting 1,5-diazabicyclo[3,3,1]nonane of the Formula II

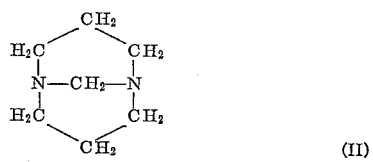

with a compound of the general Formula III

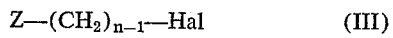

wherein $n$ has the above significance, Z is a member of the group consisting of CN and $H_2NCO$ and Hal is a member of the group consisting of chlorine, bromine and iodine, to obtain the intermediate product of the general Formula IV

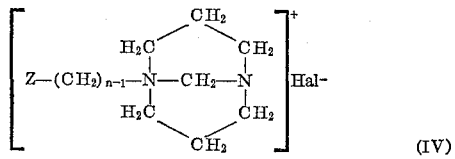

wherein $n$, Z and Hal have the above significance. The intermediate compound of the Formula IV is then treated with an alkali metal cyanide and the resulting compound of the general Formula V

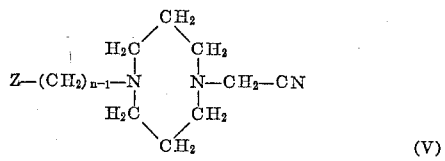

wherein $n$ and Z have the above significance, is reduced, whereby the compound of the Formula I is recovered.

The compounds of the invention may, for example, be obtained as follows: A solution of 1,5-diazacyclooctane in an inert solvent, e.g. benzene or toluene, is heated for 2 to 3 hours with paraformaldehyde, the resulting water being continuously distilled off azeotropically. The isolated 1,5-diazabicyclo[3,3,1]nonane is then condensed in an anhydrous organic solvent, e.g. absolute acetone, with a Compound III, e.g. chloro-aceto-nitrile or ω-bromo-undecanecarboxylic acid amide to obtain the quaternary salt of the Formula IV.

The bicyclic system having the grouping

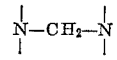

is then opened by treating Compound IV with an alkali metal cyanide, preferably potassium cyanide, to give Compound V; this reaction may suitably be effected in water at a temperature of from 0–100° C.

Compound V may be isolated and purified in accordance with known methods and, if desired, salification may be effected with an organic or inorganic acid.

The reduction of the cyanide or carbamoyl radical may be effected with a metal hydride, e.g. lithium aluminum hydride, in an inert anhydrous organic solvent, e.g. tetrahydrofuran.

Compound I may be isolated and purified in accordance with known methods and, should an acid addition salt be required, salification is effected with an organic or inorganic acid, e.g. hydrochloric, hydrobromic, hydriodic, sulphuric, citric, oxalic, tartaric, succinic, maleic, malic, acetic, benzoic, hexahydrobenzoic, methanesulphonic, fumaric and gallic.

Compounds I and their acid addition salts may be used as intermediate compounds for the production of pharmaceuticals or themselves have pharmacodynamic properties, e.g. histamine-inhibiting or an anthelmintic action; some of them may be used as vulcanisation or polymerisation catalysts or as anti-knock additives for Otto motor fuel or as detergent additives for motor oils.

In the following non-limitative examples all temperatures are stated in degrees centigrade and are uncorrected.

EXAMPLE 1

*1,5-Bis-(β-Aminoethyl)-1,5-Diazacyclooctane*

(a) 1-CYANOMETHYL-1,5-DIAZABICYCLO[3,3,1] NONANE-ONIUM CHLORIDE 16.0 g. of 1,5-diazacyclooctane (boiling point 184–186°) are heated with 5.75 g. of paraformaldehyde in 200 cc. of benzene for two hours in a water separator. After most of the benzene has been removed at normal pressure and towards the end carefully at approximately 15 mm. of Hg the residue, the 1,5-diazabicyclo[3,3,1]nonane is dissolved in 500 cc. of absolute acetone and 10.7 g. of chloroacetonitrile added to the solution. After a short time the quaternary salts starts to crystallise. The mixture is left to stand for two hours at room temperature and the remaining solution filtered. The filter residue, the 1 - cyanomethyl - 1,5 - diazabicyclo[3,3,1]nonane - onium chloride, is dried in a vacuum (hygroscopic) and recrystallised from methanol/ethyl acetate. Melting point 105–110° (decomposition).

The corresponding quaternary bromide hydrobromide is produced from the quaternary chloride by conversion with aqueous hydrobromic acid. Melting point 193° (decomposition).

(b) 1,5-BIS-(CYANOMETHYL)-1,5-DIAZACYCLOOCTANE

A cooled solution of 6.5 g. of potassium cyanide in 50 cc. of water cooled in an ice bath is added to a solution of 20.2 g. of 1-cyanomethyl-1,5-diazabicyclo[3,3,1] nonane-onium chloride in 50 cc. of water which has also been cooled in an ice bath, the solution left to stand for one hour in an ice bath and the formed precipitate filtered off. After drying in air the substance is recrystallised from 25 cc. of isopropanol. The 1,5-bis-(cyanomethyl)-1,5-diazacyclooctane melts at 83–85°.

Dihydrobromide, $C_{10}H_{16}N_4 \cdot 2HBr$, melting point 207–208° (decomposition).

(c) 1,5-BIS-(β-AMINOETHYL)-1,5-DIAZACYCLOOCTANE

At a temperature of 0–10° a solution of 36.3 g. of 1,5-bis-(cyanomethyl)-1,5-diazacyclooctane in 180 cc. of absolute tetrahydrofuran is carefully added dropwise to a solution of 36 g. of lithium aluminium hydride in 360 cc. of absolute tetrahydrofuran, the mixture stirred for a further two hours in an ice bath and two hours at room temperature and then heated at reflux for 14 hours. 100 cc. of water are added to the reaction product at a temperature of 0–15° and after stirring for one hour in an ice bath an excess of potassium hydroxide is added. The organic phase is filtered off and the residue exhaustively extracted with ether. The combined organic phases are subsequently evaporated at a pressure of approximately 15 mm. of Hg. The residue is distilled, the 1,5 - bis - (β - aminoethyl)-1,5-diazacyclooctane distilling over at 158° at a pressure of 12 mm. of Hg.

Tetrahydrobromide, $C_{10}H_{24}N_4 \cdot 4HBr$, melting point 268–270° (decomp.) from water/methanol.

EXAMPLE 2

*1,5-Bis-(β-Aminoethyl)-1,5-Diazacyclooctane*

(a) 1-CARBAMOYLMETHYL-1,5-DIAZABICYCLO[3,3,1]NONANE-ONIUM CHLORIDE 27.0 g. of 1,5-diazacyclooctane (boiling point 184–186°) are heated with 9.5 g. of paraformaldehyde in 200 cc. of benzene for two hours in a water separator. After most of the benzene has been removed at normal pressure and towards the end carefully at approximately 15 mm. of Hg, to residue, 1,5-diazabicyclo[3,3,1]nonane, is dissolved in 500 cc. of absolute acetone and 24.3 g. of α-chloroacetamide added to the solution. The mixture is left to stand for a time and the separated precipitate, the 1 - carbamoylmethyl-1,5-diazabicyclo[3,3,1]nonane-onium chloride, filtered off. After recrystallisation from ethanol the quaternary salt melts at 162–164°.

(b) 1-CARBAMOYLMETHYL-5-CYANOMETHYL-1,5-DIAZACYCLOOCTANE

A solution of 13.0 g. of potassium cyanide in 50 cc. of water cooled in an ice bath is added to a solution of 22.0 g. of 1-carbamoylmethyl-1,5-diazabicyclo[3,3,1]nonane-onium chloride in 50 cc. of water which has also been cooled in an ice bath and the two solutions are immediately intimately mixed with each other. After standing for a short time in an ice bath the crystalline residue, the 1-carbamoylmethyl-5-cyanomethyl-1,5-diazacyclooctane, is filtered off and the compound recrystallised from isopropanol. Melting point 142–143°.

(c) 1,5-BIS-(β-AMINOETHYL)-1,5-DIAZACYCLOOCTANE 18.4 g. of 1-carbamoylmethyl-5-cyanomethyl-1,5-diazacyclooctane are added to a solution of 13.5 g. of lithium aluminium hydride in 270 cc. of absolute tetrahydrofuran whilst stirring and cooling with ice, the mixture is slowly heated to the boil and the reaction mixture kept at this temperature for 14 hours. 40 cc. of water are carefully added to the reaction mixture cooled in an ice bath, the mixture stirred for 30 minutes at approximately 5° and an excess of potassium hydroxide added. The organic phase is separated and the residue exhaustively extracted with ether. The combined organic phases are then concentrated at a pressure of approximately 15 mm. of Hg. The residue is distilled, the 1,5-bis-(β-aminoethyl)-1,5-diazacyclooctane, distilling over at 164–165° at a pressure of 10 mm. of Hg.

Tetrahydrobromide, $C_{10}H_{24}N_4 \cdot 4HBr$, melting point 268–270° (decomposition) from water/methanol.

EXAMPLE 3

*1-(γ-Aminopropyl)-5-(β-Aminoethyl)-1,5-Diazacyclooctane*

22.8 g. of 1,5-diazacyclooctane (boiling point 184–186°) and 7.5 g. of paraformaldehyde in 200 cc. of benzene are heated in a water separator until the calculated quantity of water has been removed, the excess benzene is then distilled off at normal pressure and a solution of 23.6 g. of β-chloropropionic acid amide in 200 cc. of acetone added to the resulting residue, the 1,5-diazabicyclo[3,3,1]nonane. The mixture is left to stand at room temperature for four days, the crystalline quaternary salt separated and dissolved in 25 cc. of water.

A solution of 49.5 g. of potassium cyanide in 95 cc. of water is added to the resulting solution, the mixture left to stand at room temperature for two and a half hours and 50 g. of potassium hydroxide added and the mixture exhaustively extracted with ether. The ether extracts are dried over magnesium sulphate and concentrated at normal pressure. The yellow oil obtained as a residue is dissolved in 100 cc. of absolute tetrahydrofuran and the solution added dropwise to a solution of 10.4 g. of lithium aluminium hydride in 170 cc. of absolute tetrahydrofuran at 5–10°. After warming slowly the mixture is heated at reflux for 18 hours. 40 cc. of water and then an excess of solid potassium hydroxide are carefully added to the reaction mixture which has been cooled to approximately 0°. After separating the organic phase, the mixture is exhaustively extracted with ether. The combined extracts are concentrated at normal pressure and the residue subsequently distilled at a pressure of 11 mm. of Hg, the 1-(γ-aminopropyl)-5-(β-aminoethyl)-1,5-diazacyclooctane distilling over at 160–167°.

Tetramaleate: Melting point 146–147° from ethanol/water.

EXAMPLE 4

*1-(ω-Aminoundecyl)-5-(β-Aminoethyl)-1,5-Diazacyclooctane*

(a) 1-(ω-CARBAMOYLDECYL)-1,5-DIAZABICYCLO[3,3,1]NONANE-ONIUM BROMIDE 11.4 g. of 1,5-diazacyclooctane (boiling point 184–186°) and 3.75 g. of paraformaldehyde are heated in 200 cc. of boiling benzene in a water separator. After the calculated quantity of water has been removed the benzene is distilled off at normal pressure and a clear solution of 26.5 g. of ω-bromoundecanecarboxylic acid amide (melting point 85–86°) in 500 cc. of absolute acetone added to the residue, i.e. 1,5-diazabicyclo[3,3,1]nonane. After standing overnight the analytically pure 1-(ω-carbamoyldecyl)-1,5-diazabicyclo[3,3,1]nonane-onium bromide having a melting point of 115–118° crystallises.

(b) 1(ω-CARBAMOYDECYL)-5-(CYANOMETHYL)-1,5-DIAZACYCLOOCTANE

A solution of 2.0 g. of potassium cyanide in 20 cc. of water is added to a solution of 3.9 g. of 1-(ω-carbamoyldecyl)-1,5-diazabicyclo[3,3,1]nonane-onium bromide, the mixture left to stand at room temperature for four hours and the precipitated colourless 1-(ω-carbamoyldecyl)-5-(cyanomethyl)-1,5-diazacyclooctane filtered off. Melting point 59–61°.

(c) 1-(ω-AMINOUNDECYL)-5-(β-AMINOETHYL)-1,5-DIAZACYCLOOCTANE

At 0–5° a total of 11.2 g. of 1-(ω-carbamoyldecyl)-5-(cyanomethyl)-1,5-diazacyclooctane are added portionwise to a solution of 5.3 g. of lithium aluminium hydride in 230 cc. of absolute tetrahydrofuran. The reaction mixture is then warmed slowly and then heated at reflux for 13 hours. After cooling in an ice bath 20 cc. of water and then an excess of potassium hydroxide are carefully added to the reaction mixture after cooling in an ice bath. After a short time the organic phase is separated and the residue exhaustively extracted with ether. The combined extracts are concentrated at a pressure of 15 mm. of Hg and the residue distilled at 0.01 mm. of Hg, the 1-(ω-aminoundecyl)-5-(β-aminoethyl) - 1,5 - diazacyclooctane distilling over at 194–195°.

Tetramaleate: Melting point 135–137° from ethanol.

Having thus disclosed the invention, what is claimed is:

1. A member of the class consisting of 1,5-diazacyclooctane derivatives of the Formula I

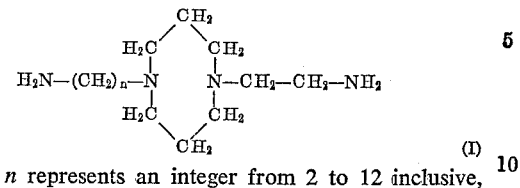

wherein $n$ represents an integer from 2 to 12 inclusive, and their non-toxic therapeutically useful addition salts with an acid selected from the group consisting of hydrohalic and mono- and dibasic organic acids.

2. 1,5-bis-($\beta$-aminoethyl)-1,5-diazacyclooctane.
3. 1-($\gamma$-aminopropyl)-5-($\beta$-aminoethyl)-1,5 - diazacyclooctane.
4. 1-($\gamma$-aminoundecyl)-5-($\beta$-aminoethyl) - 1,5 - diazacyclooctane.
5. A method of preparing 1,5-diazacyclooctane derivatives of the Formula I

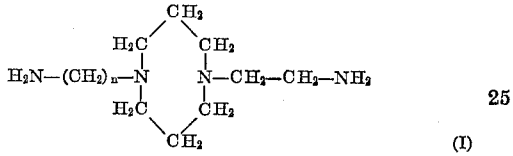

wherein $n$ represents an integer from 2 to 12 inclusive, which comprises reacting 1,5-diazabicyclo[3,3,1]nonane of the Formula II

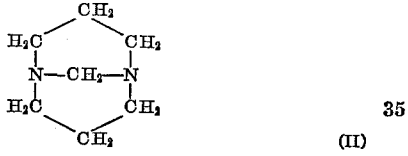

with a compound of the general Formula III

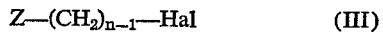

wherein $n$ has the above significance, Z is a member of the group consisting of CN and $H_2NCO$ and Hal is a member of the group consisting of chlorine, bromine and iodine, treating the resulting compound of the general Formula IV

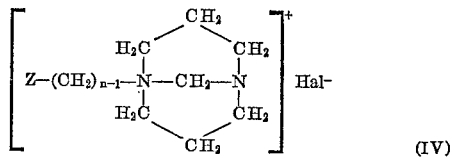

wherein $n$, Z and Hal have the above significance, with an alkali metal cyanide and reducing the resulting compound of the general Formula V

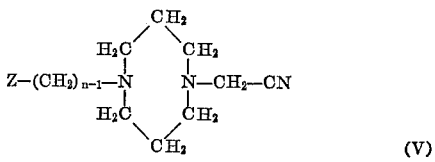

wherein $n$ and Z have the above significance.

References Cited in the file of this patent

Hernandez-Mora: Dissertation Abstracts, volume 20, 1959, pages 2032–33.